United States Patent
Wang et al.

(10) Patent No.: US 12,231,782 B2
(45) Date of Patent: Feb. 18, 2025

(54) MULTI-ILLUMINATION WHITE BALANCE CIRCUIT WITH THUMBNAIL IMAGE PROCESSING

(71) Applicant: Apple Inc., Cupertino, CA (US)

(72) Inventors: Muge Wang, San Jose, CA (US); David R Pope, Campbell, CA (US); Roberto Montagna, Cambridge (GB)

(73) Assignee: APPLE INC., Cupertino, CA (US)

( * ) Notice: Subject to any disclaimer, the term of this patent is extended or adjusted under 35 U.S.C. 154(b) by 33 days.

(21) Appl. No.: 18/127,296

(22) Filed: Mar. 28, 2023

(65) Prior Publication Data
US 2024/0334073 A1    Oct. 3, 2024

(51) Int. Cl.
*H04N 23/88* (2023.01)
*H04N 23/85* (2023.01)
*H04N 23/86* (2023.01)

(52) U.S. Cl.
CPC .............. *H04N 23/88* (2023.01); *H04N 23/85* (2023.01); *H04N 23/86* (2023.01)

(58) Field of Classification Search
CPC .......... H04N 23/88; H04N 23/85; H04N 23/86
USPC ....................................................... 348/223.1
See application file for complete search history.

(56) References Cited

U.S. PATENT DOCUMENTS

| | | | | |
|---|---|---|---|---|
| 7,551,797 B2 * | 6/2009 | Dorrell | ................. | H04N 1/6086 396/61 |
| 8,411,936 B2 * | 4/2013 | Xiao | ........................ | H04N 5/57 358/1.9 |
| 8,704,911 B2 * | 4/2014 | Shimizu | ................ | H04N 23/88 348/371 |
| 9,129,374 B2 * | 9/2015 | Xu | .............................. | G06T 5/73 |
| 10,255,879 B2 * | 4/2019 | Ballestad | ................. | H04N 9/67 |
| 10,855,964 B2 * | 12/2020 | Cao | ......................... | H04N 23/88 |
| 11,558,593 B2 * | 1/2023 | Caron | ................. | G06F 18/2415 |
| 11,803,948 B2 * | 10/2023 | Atkins | ..................... | G09G 5/10 |
| 12,100,242 B2 * | 9/2024 | Caron | ................. | G06F 18/2415 |
| 2006/0050335 A1 | 3/2006 | Dorrell et al. | | |
| 2008/0123944 A1 | 5/2008 | Xiao et al. | | |
| 2010/0067030 A1 | 3/2010 | Imai et al. | | |
| 2012/0057044 A1 | 3/2012 | Shimizu | | |
| 2013/0321700 A1 * | 12/2013 | Cote | ...................... | H04N 5/213 348/453 |
| 2014/0010472 A1 | 1/2014 | Xu | | |

(Continued)

*Primary Examiner* — Pritham D Prabhakher
(74) *Attorney, Agent, or Firm* — Sterne, Kessler, Goldstein & Fox P.L.L.C.

(57) ABSTRACT

An image processing circuit for multi-illumination white balance with thumbnail processing. The image processing circuit determines a set of initial weights for a source pixel in a thumbnail image by determining component values for multiple color channels of the source pixel. The image processing circuit determines a set of weights for the source pixel in a weight map for the thumbnail image. Each weight in the set of weights is determined based on corresponding initial weights from the set of initial weights. Each weight in the set of weights represents an intensity level of a respective chrominance class of multiple chrominance classes for the source pixel. The image processing circuit applies the set of weights to values of the color channels of the source pixel to generate color component values of the color channels of a target pixel in a target thumbnail image.

20 Claims, 9 Drawing Sheets

---

DETERMINE A SET OF INITIAL WEIGHTS FOR A SOURCE PIXEL IN A VERSION OF A THUMBNAIL IMAGE BY DETERMINING COMPONENT VALUES FOR A PLURALITY OF COLOR CHANNELS OF THE SOURCE PIXEL
902

↓

DETERMINE A SET OF WEIGHTS FOR THE SOURCE PIXEL IN A WEIGHT MAP FOR THE VERSION OF THE THUMBNAIL IMAGE, EACH WEIGHT IN THE SET OF WEIGHTS DETERMINED BASED ON CORRESPONDING INITIAL WEIGHTS FROM THE SET OF INITIAL WEIGHTS, AND EACH WEIGHT IN THE SET OF WEIGHTS REPRESENTING AN INTENSITY LEVEL OF A RESPECTIVE CHROMINANCE CLASS OF A PLURALITY OF CHROMINANCE CLASSES FOR THE SOURCE PIXEL
904

↓

APPLY THE SET OF WEIGHTS TO VALUES OF THE COLOR CHANNELS OF THE SOURCE PIXEL TO GENERATE COLOR COMPONENT VALUES OF THE COLOR CHANNELS OF A TARGET PIXEL IN A TARGET THUMBNAIL IMAGE
906

(56) References Cited

U.S. PATENT DOCUMENTS

| | | | |
|---|---|---|---|
| 2015/0348246 A1* | 12/2015 | Lim | G06T 5/00 |
| | | | 382/167 |
| 2016/0035069 A1* | 2/2016 | Min | G06T 5/20 |
| | | | 382/266 |
| 2018/0007332 A1* | 1/2018 | Lim | H04N 23/741 |
| 2018/0182352 A1 | 6/2018 | Ballestad et al. | |
| 2020/0077066 A1 | 3/2020 | Cao et al. | |
| 2021/0250565 A1* | 8/2021 | Caron | G06T 5/40 |
| 2021/0374925 A1 | 12/2021 | Finlayson et al. | |
| 2022/0164931 A1 | 5/2022 | Atkins et al. | |
| 2023/0069500 A1* | 3/2023 | Sudret | H04N 23/76 |
| 2023/0254576 A1* | 8/2023 | Marc | H04N 23/80 |

\* cited by examiner

MULTI-ILLUMINATION WHITE BALANCE CIRCUIT WITH THUMBNAIL IMAGE PROCESSING

BACKGROUND

1. Field of the Disclosure

The present disclosure relates to a circuit for processing image data, and more specifically to a multi-illumination white balance circuit with thumbnail image processing.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to performing one or more image processing algorithms.

SUMMARY

Embodiments relate to an image processing circuit for performing multi-illumination white balance on image data. The image processing circuit includes a thumbnail image processing circuit and a reintegration circuit coupled to the thumbnail image processing circuit. The thumbnail image processing circuit includes a weights determination circuit, a weight map calculation circuit coupled to the weights determination circuit, and a target thumbnail generator circuit coupled to the weight map calculation circuit. The weights determination circuit determines a set of initial weights for a source pixel in a version of a thumbnail image by determining component values for color channels of the source pixel. The weight map calculation circuit determines a set of weights for the source pixel in a weight map for the version of the thumbnail image, each weight in the set of weights is determined based on corresponding initial weights from the set of initial weights, and each weight in the set of weights represents an intensity level of a respective chrominance class of multiple chrominance classes for the source pixel. The target thumbnail generator circuit applies the set of weights to values of the color channels of the source pixel to generate color component values of the color channels of a target pixel in a target thumbnail image. The reintegration circuit applies the weight map to a set of coefficients to generate a weighted set of coefficients. The reintegration circuit further applies the weighted set of coefficients to pixel values in an input image to generate an output image.

Figure 1:
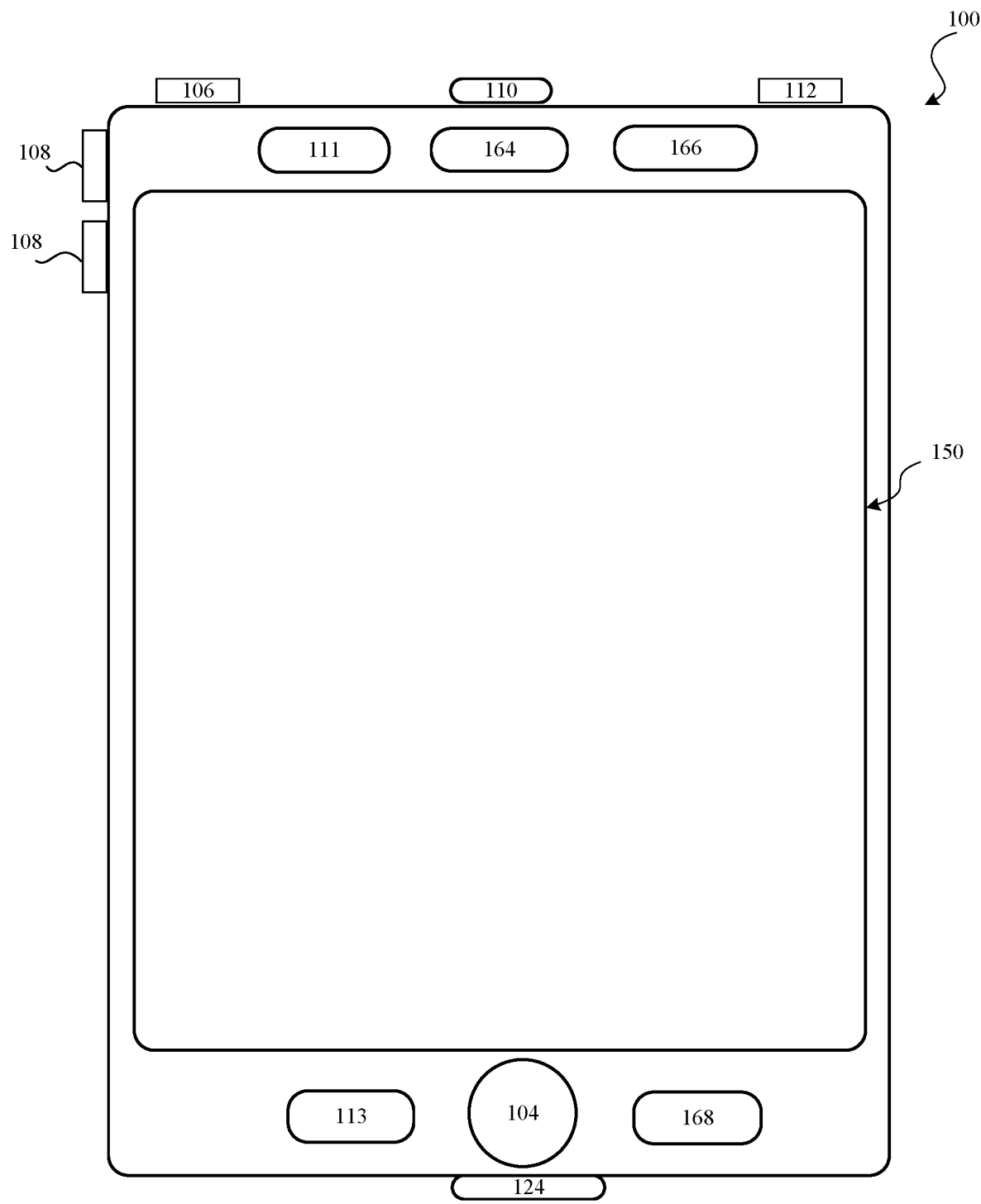
FIG. 1 is a high-level diagram of an electronic device, according to one embodiment.

The figures depict, and the detail description describes various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to an image signal processor that performs multi-illumination white balance (MIWB) on image data for, e.g., correcting colors of shadows in an input image, where the shadows are generated from different (ambient) light sources. Colors of shadows in image data generated from different light sources may deviate from actual colors (e.g., perceived by the human eye). By applying the MIWB on image data, the colors of shadows can be corrected. The MIWB is based on multi-illuminant processing of a thumbnail image (e.g., downscaled version of the input image). A weight (illuminant) map of the thumbnail image may be first determined, where each weight in the weight map represents one intensity level of a respective chrominance class (e.g., warm, cool, and neutral chrominance class) for a source pixel in the thumbnail image. The weight map may be applied to component values of color channels of source pixels in the thumbnail image to generate component values of the color channels of target pixels in a target thumbnail image with corrected colors of shadows. A preferred look from the target thumbnail image can be then translated to a full resolution image.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. Additionally or alternatively, image sensors 164 may be associated with different lens configuration. For example, device 100 may include rear image sensors, one with a wide-angle lens and another with as a telephoto lens. Device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
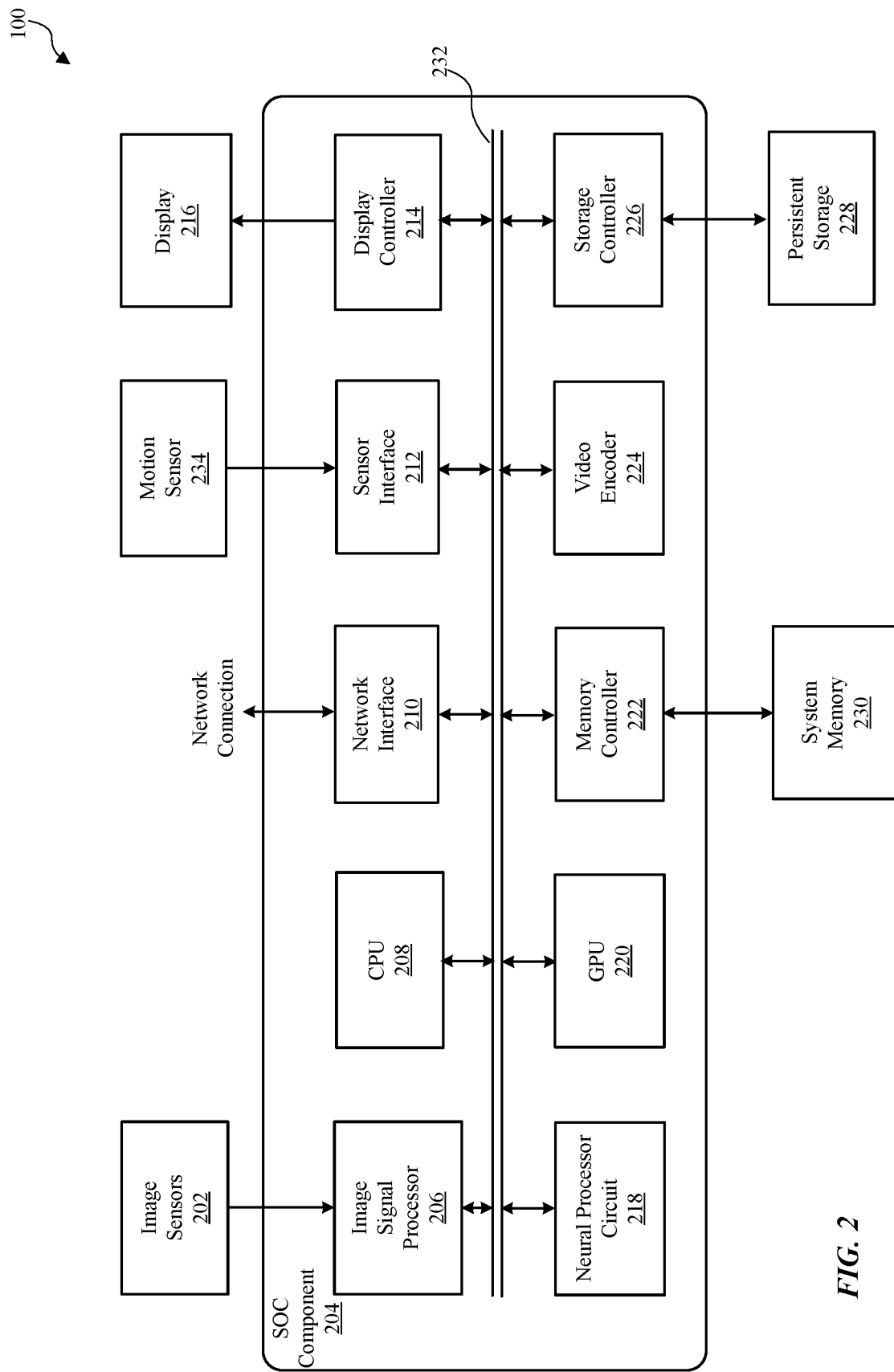
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensors 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensors 202 are components for capturing image data. Each of image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). Image sensor 202 may also include optical and mechanical components that assist image sensing components (e.g., pixels) to capture images. The optical and mechanical components may include an aperture, a lens system, and an actuator that controls the focal length of image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, a liquid crystal display (LCD) device or an organic light emitting diode (OLED) device. Based on data received from SOC component 204, display 216 may display various images, such as menus, selected operating parameters, images captured by image sensors 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor unit (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensors 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the ×86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

GPU 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from image sensors 202 and processed by ISP 206, and then sent to system memory 230 via bus 232 and memory controller 222. After the image data is stored in system memory 230, it may be accessed by video encoder 224 for encoding or by display 216 for displaying via bus 232.

In another example, image data is received from sources other than image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
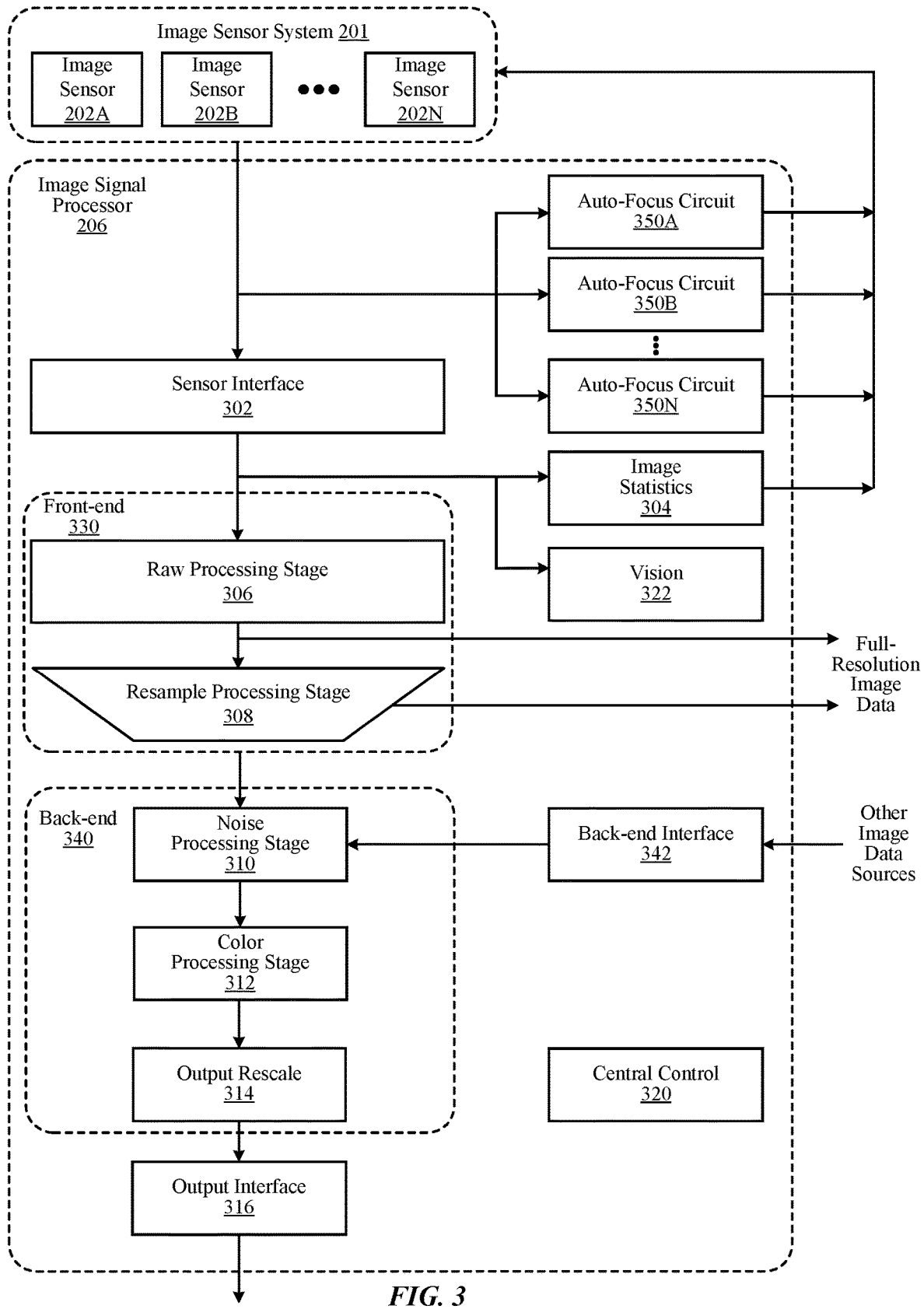
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. Image sensor system 201 may include one or more sub-systems that control image sensors 202 individually. In some cases, each image sensor 202 may operate independently while, in other cases, image sensors 202 may share some components. For example, in one embodiment, two or more image sensors 202 may share the same circuit board that controls the mechanical components of the image sensors (e.g., actuators that change the focal lengths of each image sensor). The image sensing components of image sensor 202 may include different types of image sensing components that may provide raw image data in different forms to ISP 206. For example, in one embodiment, the image sensing components may include multiple focus pixels that are used for auto-focusing and multiple image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if front-end pipeline stages 330 process two pixels per clock cycle, then raw processing stage 306 operations (e.g., black level compensation, highlight recovery and defective pixel correction) may process two pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., one pixel per clock cycle).

Raw image data captured by image sensors 202 may be transmitted to different components of ISP 206 in different manners. In one embodiment, raw image data corresponding to the focus pixels may be sent to auto-focus circuits 350 while raw image data corresponding to the image pixels may be sent to sensor interface 302. In another embodiment, raw image data corresponding to both types of pixels may simultaneously be sent to both auto-focus circuits 350 and sensor interface 302.

Auto-focus circuits 350 may include hardware circuit that analyzes raw image data to determine an appropriate focal length of each image sensor 202. In one embodiment, the raw image data may include data that is transmitted from image sensing pixels that specializes in image focusing. In another embodiment, raw image data from image capture pixels may also be used for auto-focusing purpose. Auto-focus circuit 350 may perform various image processing operations to generate data that determines the appropriate focal length. The image processing operations may include cropping, binning, image compensation, scaling to generate data that is used for auto-focusing purpose. The auto-focusing data generated by auto-focus circuits 350 may be fed back to image sensor system 201 to control the focal lengths of image sensors 202. For example, image sensor 202 may include a control circuit that analyzes the auto-focusing data to determine a command signal that is sent to an actuator associated with the lens system of image sensor 202 to change the focal length of image sensor 202. The data generated by auto-focus circuits 350 may also be sent to other components of ISP 206 for other image processing purposes. For example, some of the data may be sent to image statistics module 304 to determine information regarding auto-exposure.

Auto-focus circuits 350 may be individual circuits that are separate from other components such as image statistics module 304, sensor interface 302, front-end 330 and back-end 340. This allows ISP 206 to perform auto-focusing analysis independent of other image processing pipelines. For example, ISP 206 may analyze raw image data from image sensor 202A to adjust the focal length of image sensor 202A using auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of image sensor 202. Device 100 may perform auto focusing for different image sensors 202 even if one or more image sensors 202 are not in active use. This allows a seamless transition between two image sensors 202 when device 100 switches from one image sensor 202 to another. For example, in one embodiment, device 100 may include a wide-angle camera and a telephoto camera as a dual back camera system for photo and image processing. Device 100 may display images captured by one of the dual cameras and may switch between the two cameras from time to time. The displayed images may seamlessly transition from image data captured by one image sensor 202 to image data captured by another image sensor 202 without waiting for second image sensor 202 to adjust its focal length because two or more auto-focus circuits 350 may continuously provide auto-focus data to image sensor system 201.

Raw image data captured by different image sensors 202 may also be transmitted to sensor interface 302. Sensor interface 302 receives raw image data from image sensors 202 and processes the raw image data into an image data processable by other stages in the pipeline. Sensor interface 302 may perform various preprocessing operations, such as image cropping, binning or scaling to reduce image data size. In some embodiments, pixels are sent from image sensors 202 to sensor interface 302 in raster order (e.g., horizontally, line by line). The subsequent processes in the pipeline may also be performed in raster order and the result may also be output in raster order. Although only a single image sensor system 201 and a single sensor interface 302 are illustrated in FIG. 3, when more than one image sensor system is provided in device 100, a corresponding number of sensor interfaces may be provided in ISP 206 to process raw image data from each image sensor system.

Front-end pipeline stages 330 process image data in raw or full-color domains. Front-end pipeline stages 330 may include, but are not limited to, raw processing stage 306 and resample processing stage 308. A raw image data may be in a Bayer raw image format, for example. In the Bayer raw image format, pixel data with values specific to a particular color (instead of all colors) is provided in each pixel. In an image capturing sensor, image data is typically provided in the Bayer pattern. Raw processing stage 306 may process image data in the Bayer raw image format.

The operations performed by raw processing stage 306 include, but are not limited to, sensor linearization, black level compensation, fixed pattern noise reduction, defective pixel correction, raw noise filtering, lens shading correction, white balance gain, highlight recovery, and chromatic aberration recovery (or correction). Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in the Bayer pattern).

Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in the Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing. In another embodiment, resample processing stage 308 concerts RBD format into RGB format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics module 304. In such embodiments, each statistic module may be programmed by central control module 320 to collect different information for the same or different image data.

Vision module 322 performs various operations to facilitate computer vision operations at CPU 208 such as facial detection in image data. Vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by central control module 320) may be bilinearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three-dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform, and correct distortion on the fly as ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, the output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above in relation to FIGS. 1 and 2.

In various embodiments, the functionally of components 302 through 350 may be performed in a different order than the order implied by the order of these functional units in the image processing pipeline illustrated in FIG. 3 or may be performed by different functional components than those illustrated in FIG. 3. Moreover, the various components as described in FIG. 3 may be embodied in various combinations of hardware, firmware, or software.

Figure 4:
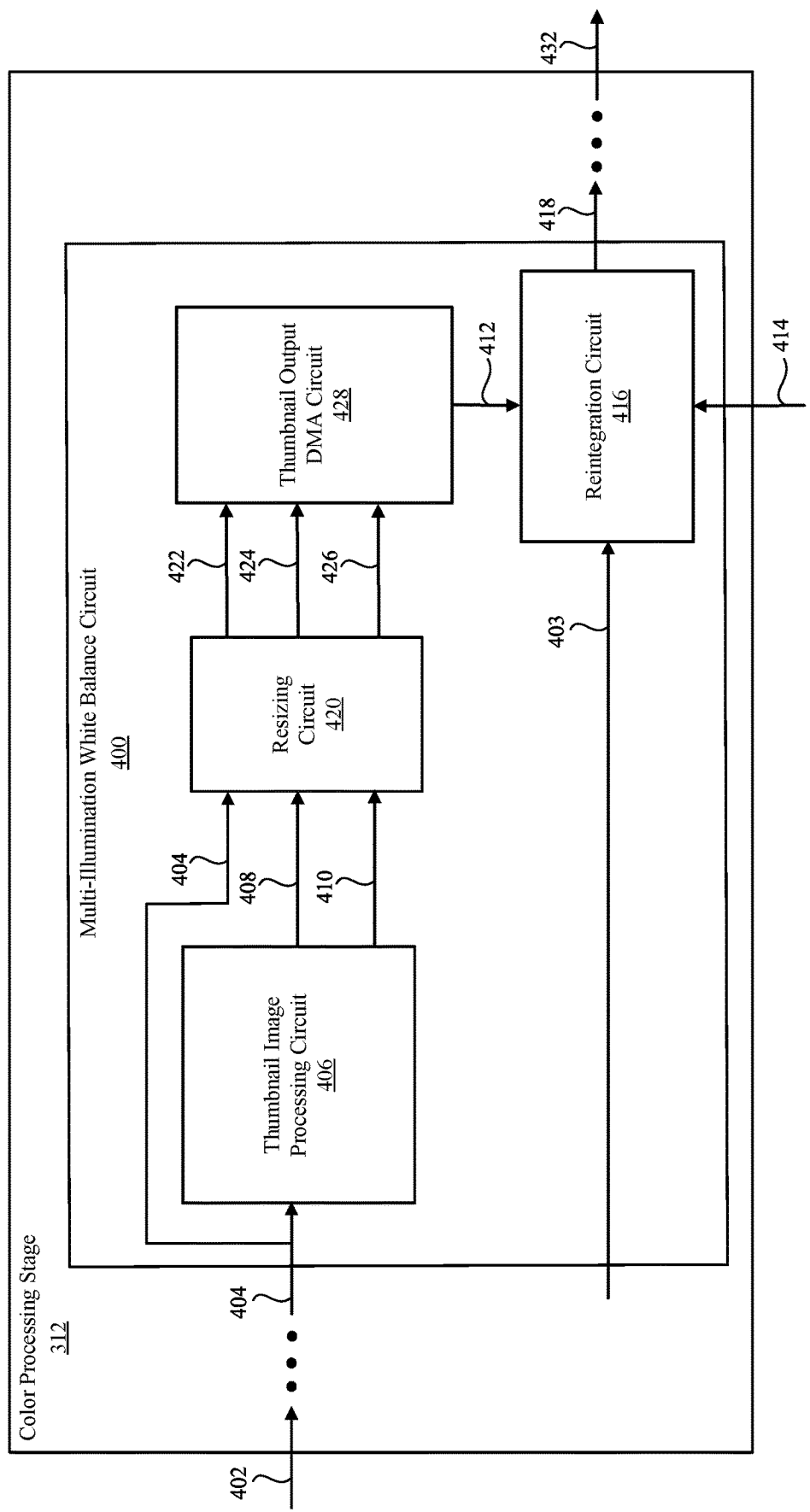
FIG. 4 is a block diagram illustrating a multi-illumination white balance (MIWB) circuit with a thumbnail image processing circuit and a reintegration circuit as part of a color processing stage, according to one embodiment.

Example Multi-Illumination White Balance Circuit with Thumbnail Image Processing FIG. 4 is a block diagram illustrating a multi-illumination white balance (MIWB) circuit 400 with a thumbnail image processing circuit 406 and a reintegration circuit 416 as part of color processing stage 312, according to one embodiment. The MIWB circuit 400 may perform MIWB on image data for, e.g., correcting colors of shadows in an image that may be generated from different ambient light sources. Colors of shadows in image data generated from different light sources may deviate from actual colors. For example, shadow areas may have a different illuminant than bright areas. The shadows may be bluer due to light from the blue sky, while the highlights may be more yellow from direct illumination from the sun. The MIWB presented herein is designed to handle such mixed illuminant cases so that, e.g., the blue color component is attenuated more in the shadows. The MIWB processing of image data may include estimation of different color intensities (e.g., color temperatures) in image data by, e.g., collecting color information about white objects, and adjusting color gains to compensate the image data for incorrect colors (e.g., of shadows). The MIWB circuit 400 may include a thumbnail image processing circuit 406, a resizing circuit 420 (optional) coupled to outputs of thumbnail image processing circuit 406, a thumbnail output direct memory access (DMA) circuit 428 coupled to outputs of resizing circuit 420 (or outputs of thumbnail image processing circuit 406 when resizing circuit 420 is bypassed), and a reintegration circuit 416 coupled to thumbnail image processing circuit 406 via thumbnail output DMA circuit 428. Color processing stage 312 includes additional components not shown in FIG. 4. Moreover, some components of color processing stage 312 described in relation to FIG. 4 may be embodied in various combinations of hardware, firmware, or software.

Image data 402 (e.g., in RGB color format) may be passed onto color processing stage 312, e.g., from noise processing stage 310. Image data 402 may be processed within color processing stage 312 to generate an input image 403 and a thumbnail image 404 (e.g., downscaled version of input image 403). Pixels of thumbnail image 404 may be passed onto thumbnail image processing circuit 406, as well as onto resizing circuit 420. Pixels of input image 403 may be passed onto reintegration circuit 416.

Thumbnail image processing circuit 406 may determine an illumination map 410. Illumination map 410 may include a weight map (e.g., a weight map 410A as described in relation to FIG. 6), where each weight in the weight map represents an intensity level of a respective chrominance class (e.g., warm, cool, and neutral) for a respective source pixel in thumbnail image 404. In addition to the weight map, illumination map 410 may also include information about a gain (e.g., gain 410B as described in relation to FIG. 6) for each global chrominance class (e.g., warm gain, and cool gain) for each source pixel in thumbnail image 404. Thumbnail image processing circuit 406 may further apply a set of weights from the weight map for the source pixel to component values of color channels of the source pixel in thumbnail image 404 to generate component values of the color channels of a target pixel in a target thumbnail image 408. Thumbnail image 404, target thumbnail image 408, and illumination map 410 may be passed onto resizing circuit 420. When resizing circuit 420 is bypassed, thumbnail image 404, target thumbnail image 408, and illumination map 410 may be passed directly onto thumbnail output DMA circuit 428.

Resizing circuit 420 may resize thumbnail image 404, target thumbnail image 408, and illumination map 410 (e.g., each to a size of input image 403) and generate a resized version of thumbnail image 422, a resized version of target thumbnail image 424, and a resized version of illumination map 426, respectively. Resized version of thumbnail image 422, resized version of target thumbnail image 424, and resized version of illumination map 426 may be stored in e.g., thumbnail output DMA circuit 428. At least portions of resized version of thumbnail image 422, resized version of target thumbnail image 424, and resized version of illumination map 426 may be fetched from thumbnail output DMA circuit 428 as illumination data 412 and passed onto reintegration circuit 416. Illumination data 412 may include, e.g., weight map 410A (or its resized version) that is part of illumination map 410 (or part of resized illumination map 426). In one or more embodiments where resizing circuit 420 is bypassed, resized version of thumbnail image 422 is thumbnail image 404, resized version of target thumbnail image 424 is target thumbnail image 408, and resized version of illumination map 426 is illumination map 410.

Reintegration circuit 416 may apply weight map 410A from illumination data 412 to a set of coefficients 414 (e.g., polynomial coefficients) to generate a weighted set of coefficients, and may apply the weighted set of coefficients to pixel values in input image 403 to generate an output image 418. Output image 418 may be passed onto one or more additional components of color processing stage 312 for color processing of output image 418 to generate output image data 432. Output image data 432 may be passed onto, e.g., output rescale module 314 and/or output interface 316. More details about a structure and operation of thumbnail image processing circuit 406 are provided in relation to FIGS. 6 and 7. More details about a structure and operation of reintegration circuit 416 are provided in relation to FIG. 8. While operations of MIWB have been described with respect to thumbnail image 404, in some embodiments, one or more of the operations of MWIB are performed on input image 403 or a processed version of input image 403.

Figure 5:
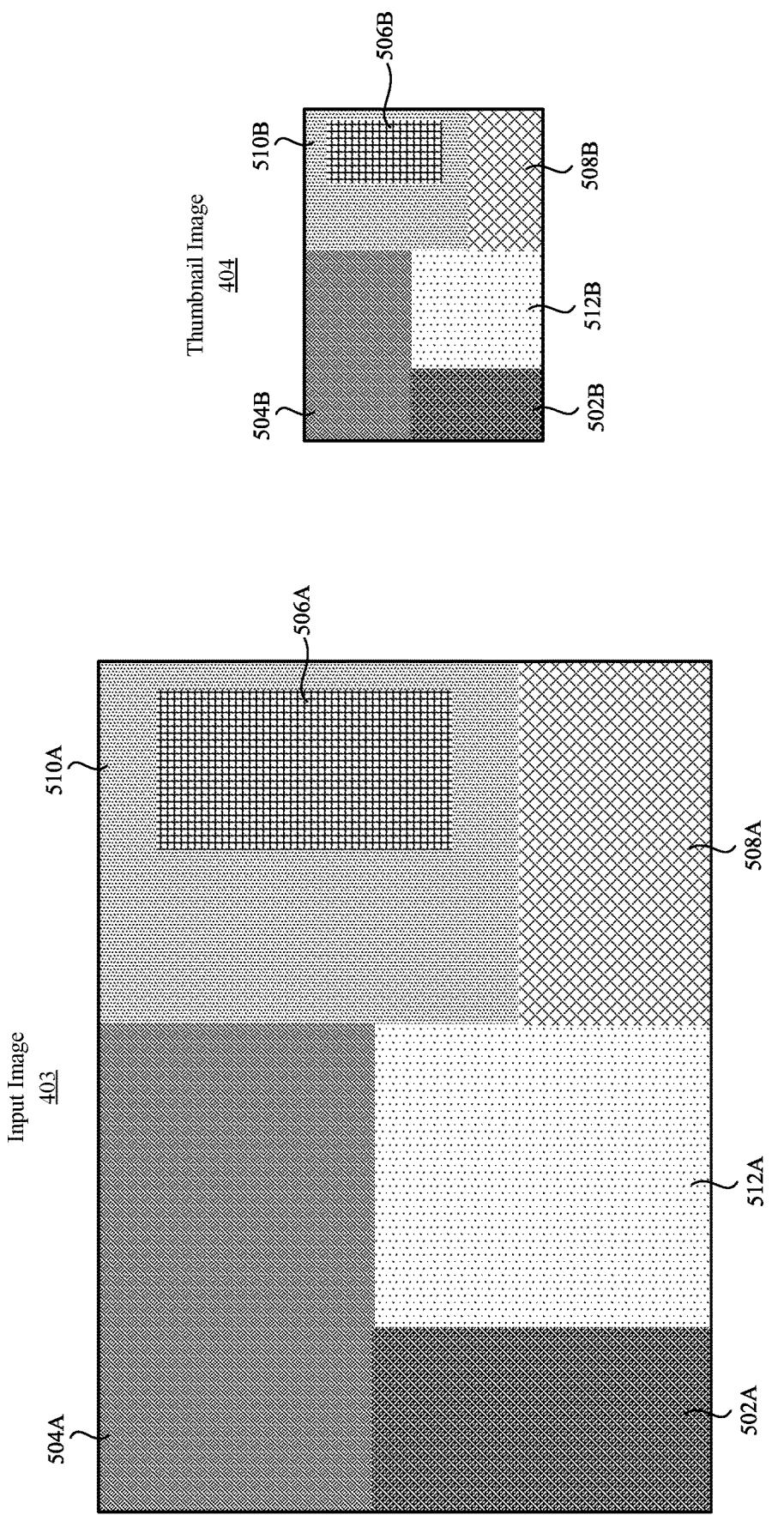
FIG. 5 illustrates an example input image and a corresponding thumbnail image with areas of different color intensities that may be processed by the MIWB circuit in FIG. 4, according to one embodiment.

FIG. 5 illustrates input image 403 and corresponding thumbnail image 404 with areas of different color intensities (e.g., color temperatures) for a color channel, according to one embodiment. Input image 403 may be a full resolution image, and may include areas 502A, 504A, 506A, 508A, 510A and 512A of different color intensities, e.g., due to various shadows generated from different ambient light sources. For example, area 502A may have a first (or lowest) color intensity; area 504A may have a second color intensity higher than the first color intensity; area 506A may have a third color intensity higher than the second color intensity; area 508A may have a fourth color intensity higher than the third color intensity; area 510A may have a fifth color intensity higher than the fourth color intensity; and area 512A may have a sixth (or highest) color intensity higher than the fifth color intensity. Input image 403 may include fewer or more areas of different color intensities than what is illustrated in FIG. 5. Each source pixel in input image 403 may be represented by a set of weights (e.g., cool, warm, and neutral weights), and each weight in the set of weights may represent an intensity level of a respective chrominance class (e.g., cool, warm, or neutral chrominance class) of multiple chrominance classes (e.g., cool, warm, and neutral chrominance classes) for the source pixel. For example, if a source pixel belongs to area 512A of a high color intensity (e.g., high color temperature or cool chroma), then a corresponding cool weight for the source pixel would be high, and corresponding warm and neutral weights for the source pixel would be relatively small. In contrast, if the source pixel belongs to area 502A in input image 403 of a low color intensity (e.g., low color temperature or warm chroma), then a corresponding warm weight for the source pixel would be the highest, and corresponding cool and neutral weights for the source pixel would be relatively small. The values of the cool, warm, and neutral weights may be normalized such that their sum is equal to a predetermined value (e.g., one).

Thumbnail image 404 may be generated by downscaling full resolution input image 403 along both horizontal and vertical directions. The size of thumbnail image 404 may be, e.g., 144×152 pixels. A ratio between the full resolution of input image 403 and a resolution of thumbnail image 404 can be integer or non-integer. In some embodiments, thumbnail image 404 is generated by downscaling input image 403 such that thumbnail image 404 includes areas 502B, 504B, 506B, 508B, 510B and 512B of different color intensities, and each area 502B, 504B, 506B, 508B, 510B and 512B represents a downscaled version of a respective area 502A, 504A, 506A, 508A, 510A and 512A in input image 403. Similarly as for input image 403, each source pixel in thumbnail image 404 may be represented by a set of weights (e.g., cool, warm, and neutral weights), and each weight in the set of weights may represent an intensity level of a respective chrominance class (e.g., cool, warm, or neutral chrominance class) of multiple chrominance classes (e.g., cool, warm, and neutral chrominance classes) for the source pixel. For example, if a source pixel belongs to an area in thumbnail image 404 of a relatively high color intensity (e.g., high color temperature or cool chroma), then a corresponding cool weight for the source pixel would be higher and corresponding warm and neutral weights for the source pixel would be smaller. In contrast, if the source pixel belongs to an area in thumbnail image 404 of a relatively low color intensity (e.g., low color temperature or warm chroma), then a corresponding warm weight for the source pixel would be higher and corresponding cool and neutral weights for the source pixel would be smaller.

Example Thumbnail Image Processing Circuit

Figure 6:
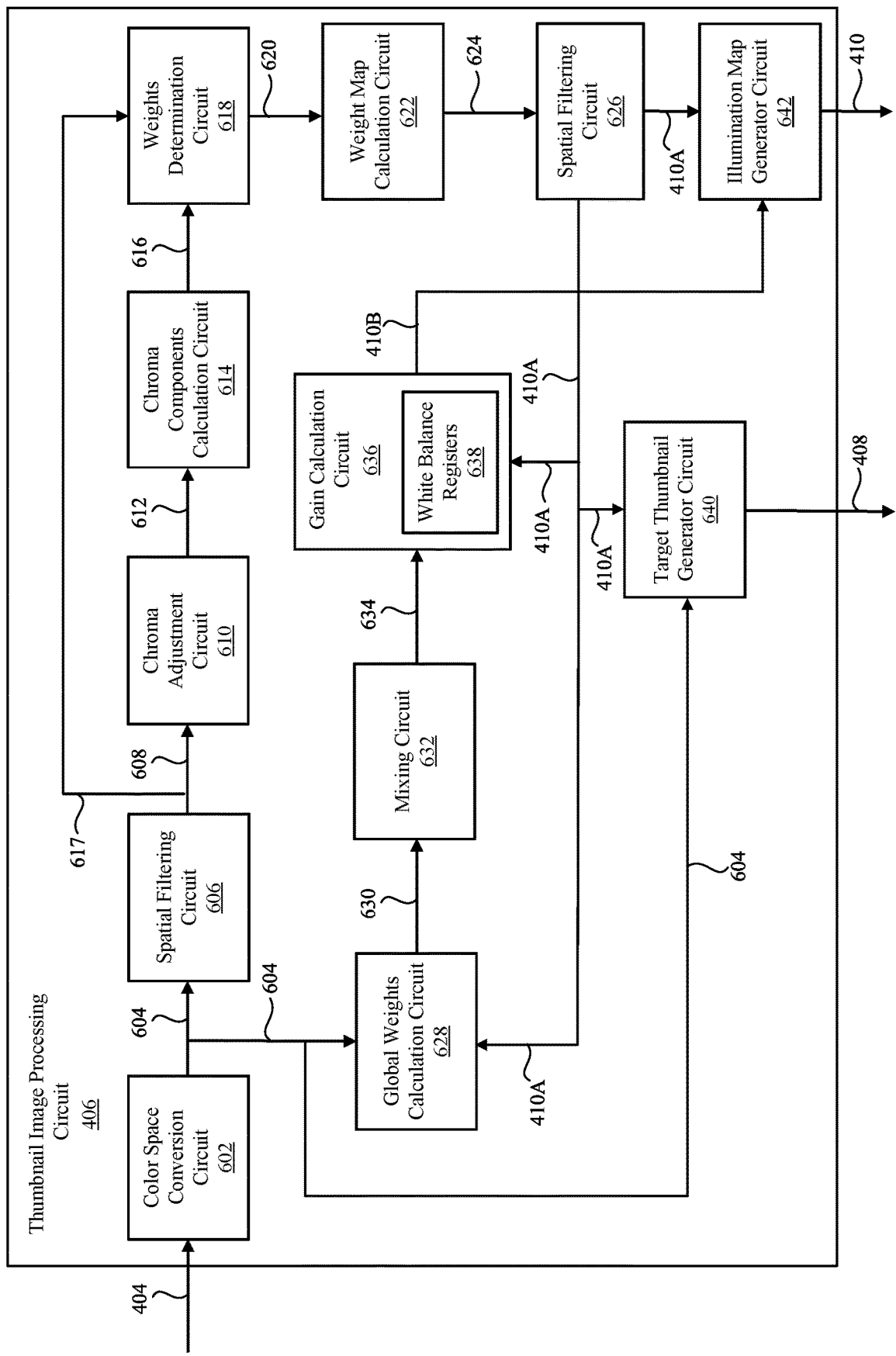
FIG. 6 is a block diagram illustrating a detailed view of the thumbnail image processing circuit in FIG. 4, according to one embodiment.

FIG. 6 is a block diagram illustrating a detailed view of thumbnail image processing circuit 406, according to one embodiment. Thumbnail image processing circuit 406 may perform color related processing of thumbnail image 404 obtained by, e.g., downscaling input image 403. Thumbnail image processing circuit 406 may include a color space conversion circuit 602, a spatial filtering circuit 606 coupled to an output of color space conversion circuit 602, a chroma adjustment circuit 610 coupled to an output of spatial filtering circuit 606, a chroma components calculation circuit 614 coupled to an output of chroma adjustment circuit 610, a weights determination circuit 618 coupled to an output of chroma components calculation circuit 614, a weight map calculation circuit 622 coupled to an output of weights determination circuit 618, a spatial filtering circuit 626 coupled to an output of weight map calculation circuit 622, a global weights calculation circuit 628 coupled to an output of color space conversion circuit 602, a mixing circuit 632 coupled to an output of global weights calculation circuit 628, a gain calculation circuit 636 (e.g., with white balance registers 638) coupled to outputs of spatial filtering circuit 626 and mixing circuit 632, a target thumbnail generator circuit 640 coupled to outputs of color space conversion circuit 602 and spatial filtering circuit 626, and an illumination map generator circuit 642 coupled to outputs of spatial filtering circuit 626 and gain calculation circuit 638. Thumbnail image processing circuit 406 may include more or fewer components than what is shown in FIG. 6. Moreover, the various components of thumbnail image processing circuit 406 described in relation to FIG. 6 may be embodied in various combinations of hardware, firmware, or software.

Color space conversion circuit 602 may perform color space conversion of pixel values of thumbnail image 404 in a first color format (e.g., RGB color format) to generate a version of thumbnail image 604 in a second color format (e.g., YCbCr color format). Color space conversion circuit 602 may convert the pixel values of thumbnail image 404 in the first color format using multiple color space conversion matrices (e.g., an inverse 3×3 color space conversion matrix, and a pair of direct 3×3 color space conversion matrices) and clipping to obtain the pixel values of version of thumbnail image 604 in the second color format. The pixel values of version of thumbnail image 604 may be passed onto spatial filtering circuit 606, as well as onto global weights calculation circuit 628.

Spatial filtering circuit 606 may perform spatial filtering (e.g., spatial 3×3 low-pass filtering) of the pixel values of version of thumbnail image 604 to generate filtered pixel values of version of thumbnail image 608. Alternatively, filtering operations performed by spatial filtering circuit 606 may be performed as part of color space conversion circuit 602. Filtered pixel values of version of thumbnail image 608 in the second color format (e.g., YCbCr color format) may be passed onto chroma adjustment circuit 610.

Chroma adjustment circuit 610 may adjust chroma component values of pixels in a version of thumbnail image 608 to generate a chroma-adjusted version of thumbnail image 612. Chroma adjustment circuit 610 may adjust (e.g., scale) chroma component values of a source pixel in version of thumbnail image 608 to generate adjusted chroma component values of the source pixel in chroma-adjusted version of thumbnail image 612. Chroma adjustment circuit 610 may adjust the chroma component values (e.g., Cr and Cb component values) of the source pixel version of thumbnail image 608, e.g., by applying a configurable two channel chroma scaler and clipping to generate the adjusted chroma component values (e.g., adjusted Cr and Cb component values, Cr' and Cb') of the source pixel in chroma-adjusted version of thumbnail image 612. Adjusted chroma component values of pixels in chroma-adjusted version of thumbnail image 612 (e.g., adjusted component values Cr' and Cb') may be passed onto chroma components calculation circuit 614.

Chroma components calculation circuit 614 may determine chroma component values 616 of the source pixel using the adjusted chroma component values of the source pixel in a chroma-adjusted version of thumbnail image 612. Chroma components calculation circuit 614 may determine a first of chroma component values 616 (e.g., C1 component value) of the source pixel by mapping the adjusted chroma component value Cr' of the source pixel to C1 space using, e.g., look-up table (LUT) entries as part of chroma components calculation circuit 614. Chroma components calculation circuit 614 may determine a second of chroma component values 616 (e.g., C2 component value) of the source pixel by applying, e.g., an offset to the adjusted chroma component value Cb' of the source pixel. At this point, the conversion from the RGB color space to the YC1C2 color space is complete. Chroma component values 616 (e.g., C1 and C2 component values) for each source pixel in chroma-adjusted version of thumbnail image 612 may be passed onto weights determination circuit 618. Additionally, a luma component value 617 (e.g., Y component value) for each source pixel in version of thumbnail image 608 may be extracted and also passed onto weights determination circuit 618.

Weights determination circuit 618 may determine a set of initial weights 620 (e.g., an initial warm weight, an initial cool weight, and luma weight) for each source pixel using chroma component values 616 (e.g., C1 and C2 component values) and luma component value 617 (e.g., Y component value) for each source pixel. Each weight in set of initial weights 620 may represent an intensity level (e.g., normalized intensity level) of a respective chrominance class (e.g., warm, cool, or luma chrominance class) of multiple chrominance classes (e.g., warm, cool, and luma chrominance classes) for each source pixel.

Figure 7:
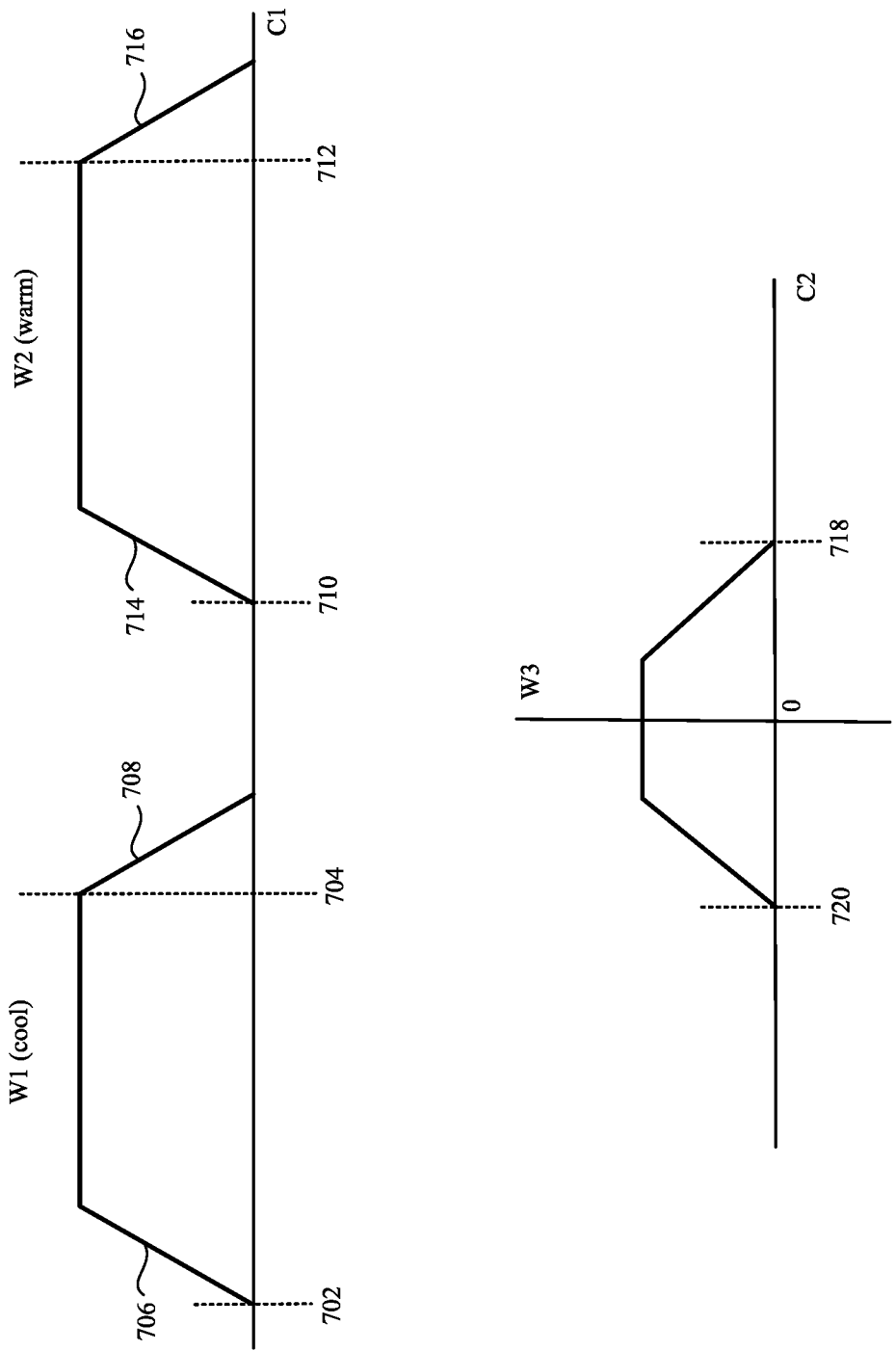
FIG. 7 is a conceptual diagram illustrating determination of weights for a pixel in a thumbnail image based on color component values of the pixel, which may be implemented as part of the thumbnail image processing circuit in FIG. 4, according to one embodiment.

FIG. 7 is a conceptual diagram illustrating determination of weights for a source pixel in YC1C2 color space, which may be implemented at weights determination circuit 618, according to one embodiment. Weights determination circuit 618 may determine the initial cool weight (e.g., W1 weight) in set of initial weights 620 for the source pixel based on first chroma component value 616 (e.g., C1 component value) for the source pixel, configurable (e.g., software programmable) knee values 702, 704 (e.g., CoolKnee1 and CoolKnee2), and configurable (e.g., software programmable) slope values 706, 708 (e.g., both equal to C1WtSlope). Weights determination circuit 618 may determine the initial warm weight (e.g., W2 weight) in set of initial weights 620 for the source pixel based on first chroma component value 616 (e.g., C1 component value) for the source pixel, configurable (e.g., software programmable) knee values 710, 712 (e.g., WarmKnee1 and WarmKnee2), and configurable (e.g., software programmable) slope values 714, 716 (e.g., both equal to C1WtSlope). Weights determination circuit 618 may determine a third weight (e.g., W3 weight) in set of initial weights 620 for the source pixel based on second chroma component value 616 (e.g., C2 component value) for the source pixel and configurable (e.g., software programmable) knee values 718, 720 (e.g., DstKnee1, −DstKnee2). Weights determination circuit 618 may finally determine the luma weight in set of initial weights 620 for the source pixel by comparing luma component value 617 for the source pixel with configurable (e.g., software programmable) luma intervals (e.g., eight luma intervals defined by nine luma values). Weights determination circuit 618 may pass set of initial weights 620 (e.g., the initial cool weight, the initial warm weight, the third weight and the luma weight) for each source pixel onto weight map calculation circuit 622.

Weight map calculation circuit 622 may generate a weight map 624 for version of thumbnail image 608 based on set of initial weights 620 for each source pixel in version of thumbnail image 608. Weight map 624 includes a two-dimensional array of set of weights (e.g., of a size corresponding to a size of version of thumbnail image 608), and each weight in a corresponding set of weights of weight map 624 may represent one (normalized) intensity level of a respective chrominance class (e.g., cool, warm, or neutral chrominance class) for each source pixel in version of thumbnail image 608. Weight map calculation circuit 622 may determine a warm weight (e.g., full warm weight) in weight map 624 for the source pixel by, e.g., multiplying the initial warm weight with the third weight and the luma weight in set of initial weights 620 for the source pixel. Weight map calculation circuit 622 may determine a cool weight (e.g., full cool weight) in weight map 624 for the source pixel by, e.g., multiplying the initial cool weight with the third weight and the luma weight in set of initial weights 620 for the source pixel. Weight map calculation circuit 622 may determine a neutral weight in weight map 624 for the source pixel such that a sum of the warm weight, the cool weight and neutral weight for the source pixel is equal to one (e.g., after normalization). Weight map calculation circuit 622 may pass weights of weight map 624 onto spatial filtering circuit 626.

Figure 8:
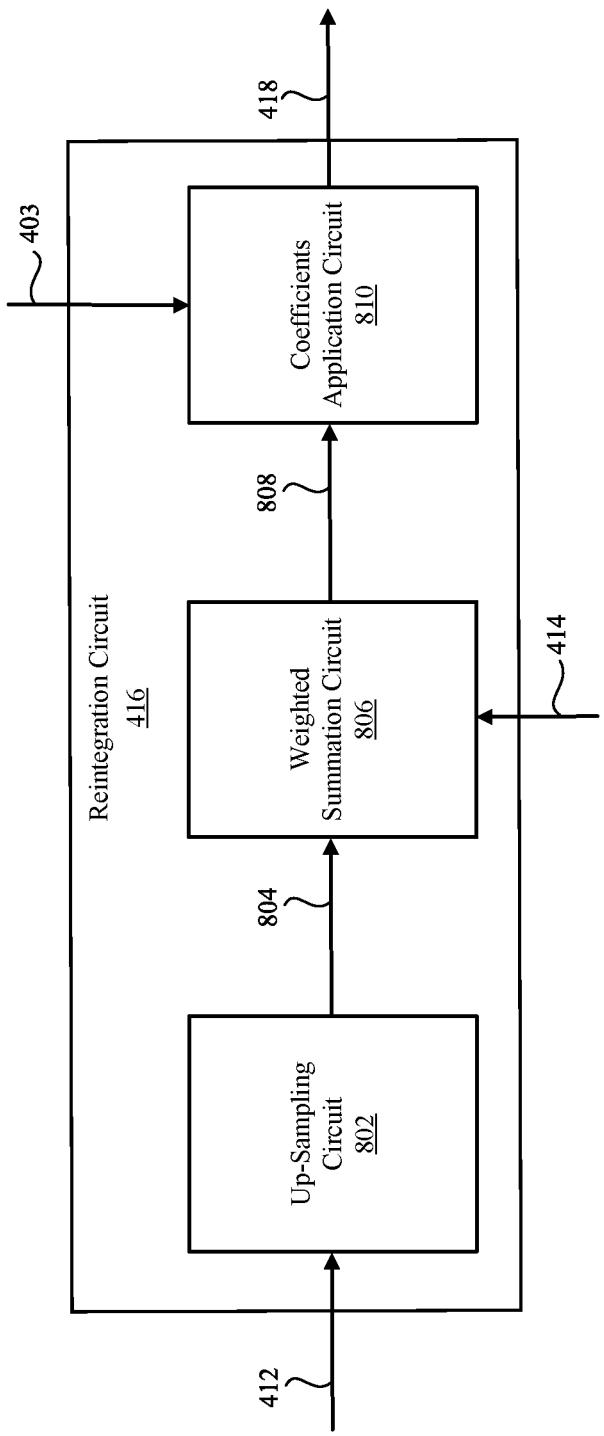
FIG. 8 is a block diagram illustrating a detailed view of the reintegration circuit in FIG. 4, according to one embodiment.

Spatial filtering circuit 626 may apply spatial filtering (e.g., 3×3 spatial filtering) to weights in weight map 624 to generate weight map 410A (e.g., filtered multi-channel weight map). Spatial filtering circuit 626 may use the same filter coefficients for both horizontal and vertical filtering. Weight map 410A may be passed as part of illumination map 410 and illumination data 412 onto reintegration circuit 416 (e.g., as shown in FIG. 4 and FIG. 8). Weight map 410A may be also passed onto global weights calculation circuit 628, gain calculation circuit 638 and target thumbnail generator circuit 640 (e.g., as shown in FIG. 6).

Global weights calculation circuit 628 may determine global weights 630 (e.g., global cool and warm weights or points) for the source pixel by applying a corresponding subset of weights (e.g., cool, warm, and neutral weights) for the source pixel in weight map 410A to color component values of the source pixel in version of thumbnail image 604. Each global weight 630 for the source pixel may represent an intensity level of a respective global chrominance class (e.g., coolness class, or warmness class) for the source pixel. Global weights calculation circuit 628 may first convert the color component values of the source pixel from YC1C2 color space to converted color component values of the source pixel in RGB color space. After that, global weights calculation circuit 628 may compute a first ratio of the converted color component values (e.g., ratio of R and G components) and a second ratio of the converted color component values (e.g., ratio of B and G components). Finally, global weights calculation circuit 628 may determine global weights 630 for the source pixel as weighted average values when the corresponding set of weights for the source pixel in weight map 410A is applied to the first and second ratios. Global weights calculation circuit 628 may pass global weights 630 for each source pixel onto mixing circuit 632.

Mixing circuit 632 may mix each global weight 630 for the source pixel with a corresponding mixing value (e.g., warm mixing value and cool mixing value) for the source pixel to generate a white gain 634 for each global chrominance class (e.g., warm white gain and cool white gain) for the source pixel. Mixing circuit 632 may pass white gains 634 (e.g., warm white gain and cool white gain) for each source pixel to gain calculation circuit 636.

Gain calculation circuit 636 may determine a gain 410B for each global chrominance class (e.g., warm gain, cool gain) for the source pixel by processing each weight gain 634 with a white balance value for the source pixel. White balance values may be stored in white balance registers 638 (e.g., as part of gain calculation circuit 636, or alternatively as part of mixing circuit 632). Gain calculation circuit 636 may further perform clipping to generate final values of gains 410B (e.g., warm gain and cool gain) for the source pixel. In some embodiments, gain calculation circuit 636 can perform operations of mixing circuit 632. Gain calculation circuit 636 may pass gains 410B (e.g., warm gain and cool gain) for each source pixel onto illumination map generator circuit 642.

Target thumbnail generator circuit 640 may apply the corresponding subset of weights (e.g., cool, warm, and neutral weights) for the source pixel in weight map 410A to color component values (R, G and B component values) for the source pixel in version of thumbnail image 604 to generate color component values (R, G and B component values) of a target pixel in target thumbnail image 408. Target thumbnail image 408 may feature corrected colors of shadows relative to original thumbnail image 404. Target thumbnail image 408 may be resized (e.g., by resizing circuit 420 to full resolution of input image 403) and stored in thumbnail output DMA circuit 428 (e.g., as shown in FIG. 4).

Illumination map generator circuit 642 may generate illumination map 410 by merging each set of weight (e.g., cool, warm, and neutral weight) for each source pixel in weight map 410A with gains 410B (e.g., warm gain, and cool gain) for each source pixel. Illumination map 410 may thus include a two-dimensional array of multi-channel points, and each multi-channel point in illumination map 410 may represent, e.g., five channel point with information about weights of different chrominance classes (e.g., cool, warm, and neutral) and information about white gains of global chrominance classes (e.g., coolness and warmness) for each source pixel. Illumination map 410 may be resized (e.g., by resizing circuit 420 to full resolution of input image 403) and stored in thumbnail output DMA circuit 428 (e.g., as shown in FIG. 4). Alternatively, resizing circuit 420 may be bypassed and illumination map 410 may be stored in thumbnail output DMA circuit 428 without any resizing.

Example Reintegration Circuit

FIG. 8 is a block diagram illustrating a detailed view of reintegration circuit 416, according to one embodiment. Reintegration circuit 416 may transfer a preferred look (e.g., "steal the feel") from a thumbnail image (e.g., target thumbnail image 408) to a full resolution image (e.g., output image 418). Reintegration circuit 416 may receive illumination data 412 (e.g., from thumbnail output DMA circuit 428) that include weight map 410A. Reintegration circuit 416 may apply weight map 410A from illumination data 412 to a set of coefficients 414 (e.g., polynomial coefficients) to generate a weighted set of coefficients, and apply the weighted set of coefficients to input image 403 to generate output image 418. Output image 418 may have corrected colors of shadows relative to input image 403. Reintegration circuit 416 may include an up-sampling circuit 802, a weighted summation circuit 806 coupled to an output of up-sampling circuit 802, and a coefficients application circuit 810 coupled to an output of weighted summation circuit 806. Reintegration circuit 416 may include more or fewer components than what is shown in FIG. 8. Moreover, the various components of reintegration circuit 416 described in relation to FIG. 8 may be embodied in various combinations of hardware, firmware, or software.

Up-sampling circuit 802 may perform up-sampling (e.g., grid-based bilinear up-sampling) of weight map 410A from illumination data 412 to generate an up-sampled weight map 804. Each weight for each color channel in up-sampled weight map 804 may be determined by applying, e.g., bilinear interpolation of weights for that color channel that correspond to a neighboring grid (e.g., 2×2 grid). Each weight in up-sampled weight map 804 may represent one intensity level of the respective chrominance class (e.g., warm, cool, or neutral chrominance class) for each color channel of a source pixel in input image 403. Up-sampled weight map 804 may be passed onto weighted summation circuit 806.

Weighted summation circuit 806 may apply up-sampled weight map 804 to set of coefficients 414 (e.g., polynomial coefficients) to generate a weighted set of coefficients 808. Weighted summation circuit 806 may determine each weighted coefficient 808 for each color channel (e.g., of R, G, B color channels) by performing weighted summation of coefficients 414 for that color channel after a corresponding subset of weights in up-sampled weight map 804 are applied to coefficients 414. Weighted set of coefficients 808 may be passed onto coefficients application circuit 810.

Coefficients application circuit 810 may be a filtering circuit that applies weighted set of coefficients 808 to source pixel values in input image 403 to generate processed pixel values in output image 418. Coefficients application circuit 810 may apply a weighted coefficient 808 for each color channel (e.g., each of R, G, B color channels) to a component value for each color channel of a source pixel in input image 403 to generate a processed component value for each color channel of a processed pixel in output image 418.

Example Process of MIWB with Thumbnail Processing

Figure 9:
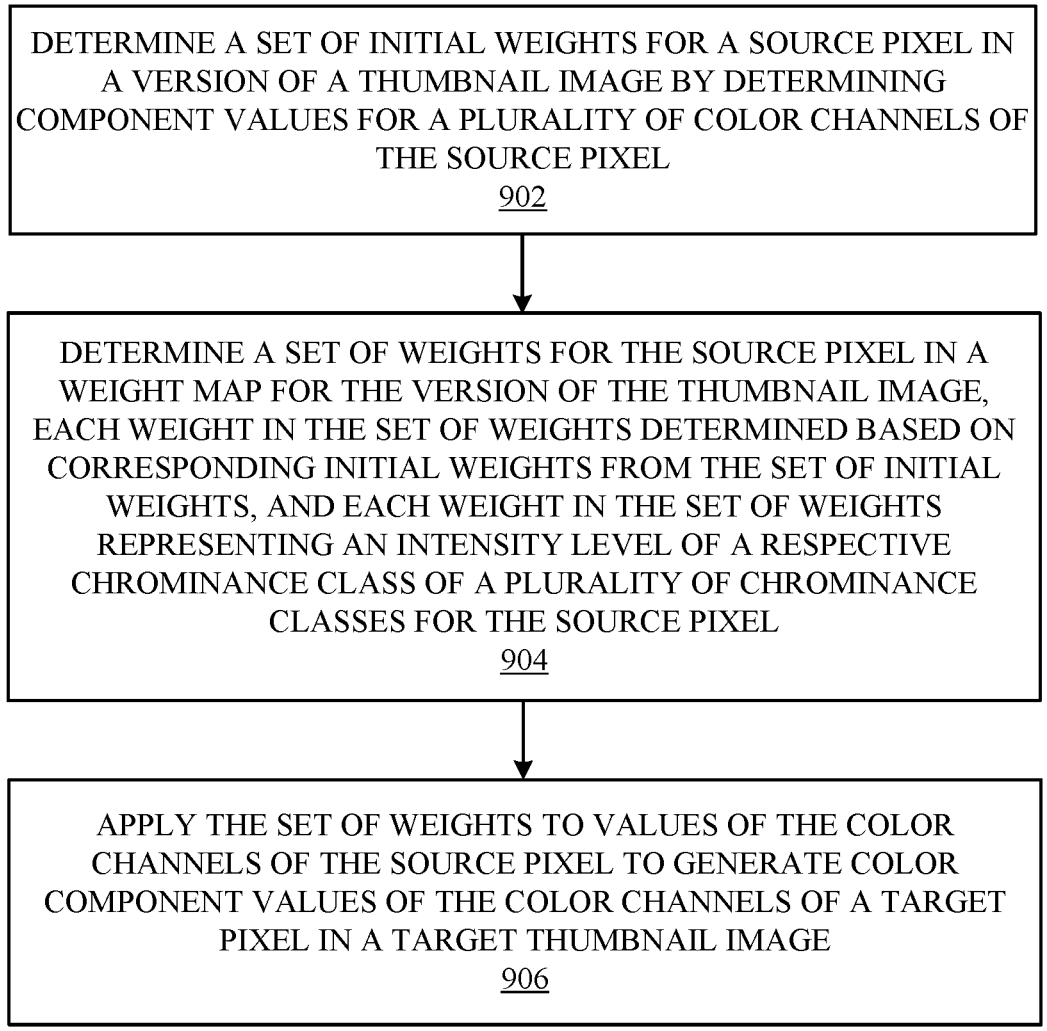
FIG. 9 is a flowchart illustrating a method of multi-illumination white balance with thumbnail processing of image data, according to one embodiment.

FIG. 9 is a flowchart illustrating a method of multi-illumination white balance with thumbnail processing performed by an image processor (e.g., ISP 206), according to one embodiment. The image processor determines 902 (e.g., via weights determination circuit 618) a set of initial weights for a source pixel in a version of a thumbnail image by determining component values for color channels of the source pixel.

The image processor may adjust (e.g., via chroma adjustment circuit 610) chroma component values of the source pixel to generate adjusted chroma component values of the source pixel. The image processor may determine (e.g., via chroma components calculation circuit 614) a first chroma component value and a second chroma component value of the source pixel using the adjusted chroma component values. The image processor may determine (e.g., via weights determination circuit 618) the set of initial weights for the source pixel using the first chroma component value and the second chroma component value.

The image processor may perform (e.g., via color space conversion circuit 602) color space conversion of pixel values of the thumbnail image in a first color format to generate the version of the thumbnail image in a second color format. The image processor may perform (e.g., via spatial filtering circuit 606) spatial filtering of pixel values of the thumbnail image to generate the version of the thumbnail image.

The image processor determines 904 (e.g., via weight map calculation circuit 622) a set of weights for the source pixel in a weight map for the version of the thumbnail image, each weight in the set of weights determined based on corresponding initial weights from the set of initial weights, and each weight in the set of weights representing an intensity level of a respective chrominance class of multiple chrominance classes for the source pixel. The image processor may determine (e.g., via global weights calculation circuit 628) global weights for the source pixel by applying the set of the weights to color component values of the source pixel, each of the global weights representing an intensity level of a respective global chrominance class of multiple global chrominance classes for the source pixel. The image processor may determine (e.g., via gain calculation circuit 638) a gain for each global chrominance class of the global chrominance classes for the source pixel by processing the global weights for the source pixel and a corresponding white balance gain for the source pixel. The image processor may mix (e.g., via mixing circuit 632) each of the global weights for the source pixel with a corresponding mixing value for the source pixel to generate a white gain for each global chrominance class of the global chrominance classes for the source pixel. The image processor may determine (e.g., via gain calculation circuit 638) the gain for each global chrominance class of the global chrominance classes for the source pixel by clipping the white gain for each global chrominance class of the global chrominance classes for the source pixel.

The image processor may adjust (e.g., via chroma adjustment circuit 610) chroma component values of pixels of the version of the thumbnail image to generate a chroma-adjusted version of the thumbnail image. The image processor may determine (e.g., via weights determination circuit 618) the set of initial weights for each pixel in the chroma-scaled version of the thumbnail image using the adjusted chroma component values. The image processor may determine (e.g., via weight map calculation circuit 622) the weight map by computing a set of full weights for each pixel in the chroma-scaled version of the thumbnail image using the set of initial weights for each pixel in the chroma-scaled version of the thumbnail image. The image processor may generate (e.g., via spatial filtering circuit 626) a filtered multi-channel weight map by applying spatial filtering to the weight map, the filtered multi-channel weight map including a two-dimensional array of weights, each weight in the array representing an intensity level of the respective chrominance class for each pixel in the thumbnail image.

The image processor applies 906 (e.g., via target thumbnail generator circuit 640) the set of weights to values of the color channels of the source pixel to generate color component values of the color channels of a target pixel in a target thumbnail image. The image processor may store (e.g., at thumbnail output DMA circuit 428) least one of an illumination map, the target thumbnail image, and the thumbnail image, the illumination map including the weight map and the gain for each global chrominance class.

Embodiments of the process as described above with reference to FIG. 9 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An image processing circuit, comprising:
   a weights determination circuit configured to determine a set of initial weights for a source pixel in a version of a thumbnail image by determining component values for a plurality of color channels of the source pixel;
   a weight map calculation circuit coupled to the weights determination circuit and configured to determine a set of weights for the source pixel in a weight map for the version of the thumbnail image, each weight in the set of weights determined based on corresponding initial weights from the set of initial weights, each weight in the set of weights representing an intensity level of a respective chrominance class of a plurality of chrominance classes for the source pixel; and
   a target thumbnail generator circuit coupled to the weight map calculation circuit and configured to apply the set of weights to values of the plurality of color channels of the source pixel to generate color component values of the plurality of color channels of a target pixel in a target thumbnail image.

2. The image processing circuit of claim 1, further comprising:
   a global weights calculation circuit coupled to the weight map calculation circuit and configured to determine global weights for the source pixel by applying the set of weights to color component values of the source pixel, each of the global weights representing an intensity level of a respective global chrominance class of a plurality of global chrominance classes for the source pixel; and
   a gain calculation circuit coupled to the global weights calculation circuit and configured to determine a gain for each global chrominance class of the plurality of global chrominance classes for the source pixel by processing the global weights for the source pixel and a corresponding white balance gain for the source pixel.

3. The image processing circuit of claim 2, further comprising:
   a thumbnail output direct memory access (DMA) circuit coupled to the weight map calculation circuit and the target thumbnail generator circuit, the thumbnail output DMA circuit configured to store at least one of an illumination map, the target thumbnail image, and the thumbnail image, the illumination map including the weight map and the gain for each global chrominance class.

4. The image processing circuit of claim 2, further comprising:
   a mixing circuit coupled to the global weights calculation circuit and the gain calculation circuit, the mixing circuit configured to mix each of the global weights for the source pixel with a corresponding mixing value for the source pixel to generate a white gain for each global chrominance class of the plurality of global chrominance classes for the source pixel, wherein
   the gain calculation circuit is further configured to determine the gain for each global chrominance class of the plurality of global chrominance classes for the source pixel by clipping the white gain for each global chrominance class of the plurality of global chrominance classes for the source pixel.

5. The image processing circuit of claim 1, further comprising:
   a chroma adjustment circuit coupled to the weights determination circuit and configured to adjust chroma component values of the source pixel to generate adjusted chroma component values of the source pixel; and
   a chroma components calculation circuit coupled to the chroma adjustment circuit and configured to determine a first chroma component value and a second chroma component value of the source pixel using the adjusted chroma component values of the source pixel, wherein
   the weights determination circuit is further configured to determine the set of initial weights for the source pixel using the first chroma component value and the second chroma component value.

6. The image processing circuit of claim 1, further comprising:
   a color space conversion circuit coupled to the weights determination circuit and configured to perform color space conversion of pixel values of the thumbnail image in a first color format to generate the version of the thumbnail image in a second color format.

7. The image processing circuit of claim 1, further comprising:
a spatial filtering circuit coupled to the weights determination circuit and configured to perform spatial filtering of pixel values of the thumbnail image to generate the version of the thumbnail image.

8. The image processing circuit of claim 1, further comprising:
a chroma adjustment circuit coupled to the weights determination circuit and configured to adjust chroma component values of pixels of the version of the thumbnail image to generate a chroma-adjusted version of the thumbnail image, wherein
the weights determination circuit is further configured to determine the set of initial weights for each pixel in a chroma-scaled version of the thumbnail image using adjusted chroma component values of the pixels.

9. The image processing circuit of claim 8, wherein the weight map calculation circuit is further configured to:
determine the weight map by computing a set of full weights for each pixel in the chroma-scaled version of the thumbnail image using the set of initial weights for each pixel in the chroma-scaled version of the thumbnail image.

10. The image processing circuit of claim 1, further comprising:
a spatial filtering circuit coupled to the weight map calculation circuit and configured to generate a filtered multi-channel weight map by applying spatial filtering to the weight map, the filtered multi-channel weight map including a plurality of weights, each weight of the plurality of weights representing an intensity level of the respective chrominance class for each pixel in the thumbnail image.

11. A method for image processing, the method comprising:
determining a set of initial weights for a source pixel in a version of a thumbnail image by determining component values for a plurality of color channels of the source pixel;
determining a set of weights for the source pixel in a weight map for the version of the thumbnail image, each weight in the set of weights determined based on corresponding initial weights from the set of initial weights, each weight in the set of weights representing an intensity level of a respective chrominance class of a plurality of chrominance classes for the source pixel; and
applying the set of weights to values of the plurality of color channels of the source pixel to generate color component values of the plurality of color channels of a target pixel in a target thumbnail image.

12. The method of claim 11, further comprising:
determining global weights for the source pixel by applying the set of weights to color component values of the source pixel, each of the global weights representing an intensity level of a respective global chrominance class of a plurality of global chrominance classes for the source pixel;
determining a gain for each global chrominance class of the plurality of global chrominance classes for the source pixel by processing the global weights for the source pixel and a corresponding white balance gain for the source pixel; and
storing at least one of an illumination map, the target thumbnail image, and the thumbnail image in a thumbnail output direct memory access (DMA) circuit, the illumination map including the weight map and the gain for each global chrominance class.

13. The method of claim 12, further comprising:
mixing each of the global weights for the source pixel with a corresponding mixing value for the source pixel to generate a white gain for each global chrominance class of the plurality of global chrominance classes for the source pixel; and
determining the gain for each global chrominance class of the plurality of global chrominance classes for the source pixel by clipping the white gain for each global chrominance class of the plurality of global chrominance classes for the source pixel.

14. The method of claim 11, further comprising:
adjusting chroma component values of the source pixel to generate adjusted chroma component values of the source pixel;
determining a first chroma component value and a second chroma component value of the source pixel using the adjusted chroma component values of the source pixel; and
determining the set of initial weights for the source pixel using the first chroma component value and the second chroma component value.

15. The method of claim 11, further comprising:
performing color space conversion of pixel values of the thumbnail image in a first color format to generate the version of the thumbnail image in a second color format.

16. The method of claim 11, further comprising:
performing spatial filtering of pixel values of the thumbnail image to generate the version of the thumbnail image.

17. The method of claim 11, further comprising:
adjusting chroma component values of pixels of the version of the thumbnail image to generate a chroma-adjusted version of the thumbnail image;
determining the set of initial weights for each pixel in a chroma-scaled version of the thumbnail image using adjusted chroma component values of the pixels; and
determining the weight map by computing a set of full weights for each pixel in the chroma-scaled version of the thumbnail image using the set of initial weights for each pixel in the chroma-scaled version of the thumbnail image.

18. An image processing circuit, comprising:
a thumbnail image processing circuit including:
a weights determination circuit configured to determine a set of initial weights for a source pixel in a version of a thumbnail image by determining component values for a plurality of color channels of the source pixel,
a weight map calculation circuit coupled to the weights determination circuit and configured to determine a set of weights for the source pixel in a weight map for the version of the thumbnail image, each weight in the set of weights determined based on corresponding initial weights from the set of initial weights, each weight in the set of weights representing an intensity level of a respective chrominance class of a plurality of chrominance classes for the source pixel, and
a target thumbnail generator circuit coupled to the weight map calculation circuit and configured to apply the set of weights to values of the plurality of color channels of the source pixel to generate color component values of the plurality of color channels of a target pixel in a target thumbnail image; and a reintegration circuit coupled to the thumbnail image processing circuit and configured to:
- apply the weight map to a set of coefficients to generate a weighted set of coefficients, and
- apply the weighted set of coefficients to pixel values in an input image to generate an output image.

19. The image processing circuit of claim 18, wherein the thumbnail image processing circuit further comprises:
- a global weights calculation circuit coupled to the weight map calculation circuit and configured to determine global weights for the source pixel by applying the set of weights to color component values of the source pixel, each of the global weights representing an intensity level of a respective global chrominance class of a plurality of global chrominance classes for the source pixel;
- a gain calculation circuit coupled to the global weights calculation circuit and configured to determine a gain for each global chrominance class of the plurality of global chrominance classes for the source pixel by processing the global weights for the source pixel and a corresponding white balance gain for the source pixel; and
- a thumbnail output direct memory access (DMA) circuit coupled to the weight map calculation circuit and the target thumbnail generator circuit, the thumbnail output DMA circuit configured to store at least one of an illumination map, the target thumbnail image, and the thumbnail image, the illumination map including the weight map and the gain for each global chrominance class.

20. The image processing circuit of claim 18, wherein the thumbnail image processing circuit further comprises:
- a chroma adjustment circuit coupled to the weights determination circuit and configured to adjust chroma component values of the source pixel to generate adjusted chroma component values of the source pixel; and
- a chroma components calculation circuit coupled to the chroma adjustment circuit and configured to determine a first chroma component value and a second chroma component value of the source pixel using the adjusted chroma component values of the source pixel, wherein the weights determination circuit is further configured to determine the set of initial weights for the source pixel using the first chroma component value and the second chroma component value.

* * * * *